(12) United States Patent
Lyon et al.

(10) Patent No.: US 11,837,986 B2
(45) Date of Patent: Dec. 5, 2023

(54) SYSTEMS AND METHODS FOR CONTROLLING MOTORS USING FUSIONS OF MOTOR ENCODER AND RESOLVER FEEDBACK

(71) Applicant: L3Harris Technologies, Inc., Melbourne, FL (US)

(72) Inventors: Scott M. Lyon, South Weber, UT (US); Daniel G. Chilinski, Layton, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 31 days.

(21) Appl. No.: 17/669,641

(22) Filed: Feb. 11, 2022

(65) Prior Publication Data
US 2023/0261592 A1   Aug. 17, 2023

(51) Int. Cl.
*H02P 5/50* (2016.01)
*H02P 21/18* (2016.01)

(52) U.S. Cl.
CPC ............... *H02P 5/50* (2013.01); *H02P 21/18* (2016.02)

(58) Field of Classification Search
None
See application file for complete search history.

(56) References Cited

U.S. PATENT DOCUMENTS

| | | | | |
|---|---|---|---|---|
| 4,093,904 A | * | 6/1978 | Burig | G05B 19/353 700/72 |
| 4,346,334 A | * | 8/1982 | Inoue | D05B 69/18 318/45 |
| 4,470,562 A | * | 9/1984 | Hall | F41G 7/343 244/3.22 |
| 5,129,600 A | * | 7/1992 | Polites | B64G 1/22 74/61 |
| 5,557,285 A | | 9/1996 | Bender et al. | |
| 2009/0179635 A1 | | 7/2009 | Cathey | |

(Continued)

FOREIGN PATENT DOCUMENTS

EP     3415285 A2    12/2018

OTHER PUBLICATIONS

Shukl et al.: "Combined IIR and FIR Filter for Improved Power Quality of PV Interfaced Utility Grid", IEEE Transaction on Industry Applications, vol. 57, No. 1, Jan./Feb. 2021.

(Continued)

*Primary Examiner* — Bickey Dhakal
(74) *Attorney, Agent, or Firm* — Fox Rothschild LLP; Carol Thorstad-Forsyth (57) ABSTRACT

Systems and methods for operating a motorized system. The methods comprise by a circuit: receiving a first position signal generated by a gimbal resolver coupled to a load, a second position signal generated by a first motor encoder coupled to a shaft of a first motor, and a third position signal generated by a second motor encoder coupled to a shaft of a second motor; converting the second and third position signals into a velocity signal specifying a scaled velocity of the load; converting the velocity signal into a fourth position signal specifying a position of the load; combining the first position signal and the fourth position signal to generate a fifth position signal representing a stable position of the load; and using the fifth position signal to control operations of the first and second motors.

19 Claims, 8 Drawing Sheets

(56) References Cited

U.S. PATENT DOCUMENTS

2013/0293167 A1* 11/2013 Harris, III ................. H02P 5/50
318/400.13
2014/0312815 A1   10/2014 Leonardi et al.

OTHER PUBLICATIONS

Duan et al., "Pointing control design based on the PID type-III control loop for two-axis gimbal systems," Sensors and Actuators A: Physical, vol. 331, 10 pages (2021).

* cited by examiner

SYSTEMS AND METHODS FOR CONTROLLING MOTORS USING FUSIONS OF MOTOR ENCODER AND RESOLVER FEEDBACK

BACKGROUND

Statement of the Technical Field

The present document concerns motor-based systems. More specifically, the present document concerns systems and methods for controlling motors using fusions of motor encoder and resolver feedback.

Description of the Related Art

There are many motor-based systems known in the art. One such system comprises an antenna system mounted on an aircraft, a mobile ground platform, a shipboard platform, a fixed platform (e.g., a ground station) or other object. The antenna system has a reflector coupled to a motorized pedestal. The motorized pedestal is generally configured to rotate and position the parabolic reflector during use for various purposes such as direction finding for locating, identify and tracking a moving emitter (e.g., an orbiting satellite). The rotation/positioning of the reflector is achieved using servo motors and a servo control system.

SUMMARY

This document concerns systems and methods for operating a motorized system (e.g., an antenna system). The methods comprise by a circuit: receiving a first position signal generated by a resolver coupled to a load (e.g., a gimbal), a second position signal generated by a first motor encoder coupled to a shaft of a first motor, and a third position signal generated by a second motor encoder coupled to a shaft of a second motor; converting the second and third position signals into a velocity signal specifying a scaled velocity of the load; converting the velocity signal into a fourth position signal specifying a position of the load; combining the first position signal and the fourth position signal to generate a fifth position signal representing a stable position of the load; and using the fifth position signal to control operations of the first and second motors. The resolver can include, but is not limited to, a gimbal resolver.

The first position signal may specify a gimbal axis position, the second position signal may specify a position for the shaft of the first motor, and the third position signal may specify a position for the shaft of the second motor. The second and third position signals may be converted into the velocity signal using a combiner differentiation algorithm, and the velocity signal is converted into the fourth position signal using an integration algorithm. The combining may comprise operations implementing the following mathematical equations:

$$Ave_{i+1} = Ave_i - (1/K)D,$$

$$D = Ave_i - (Resolver_m - Encoder_m),$$

$$CombinedOutput_{m+1} = Ave_{i+1} + Encoder_{m+1}$$

wherein $Resolver_m$ represents the first position signal, $Encoder_m$ represents the fourth encoder signal, $Ave_i$ represents an average signal output from an infinite impulse response filter, $Encoder_{m+1}$ represents a sixth signal specifying a next position of the load, and $CombinedOutput_{m+1}$ represents a signal specifying the stable position of the load. K is a constant that controls how fast the filter converges.

D may be combined with a Finite Impulse Response (FIR) filter prior to being subtracted from $Ave_i$. In this case, the above mathematical equation $Ave_{i+1} = Ave_i - D$ can be modified as shown below.

$$Ave_{i+1} = Ave_i - \sum_{m=1}^{Taps} a_n(Ave_i - (Resolver_m - Encoder_m)), \text{ or}$$

$$Ave_{i+1} = Ave_i - \frac{1}{K}\sum_{m=1}^{Taps} a_m(Ave_i - (Resolver_m - Encoder_m))$$

where Taps represents the number of taps for the FIR filter, $a_n$ represents the FIR filter coefficients divided by the constant from the previous filter of K, $a_m$ represents the coefficients for the FIR filter, and K is a constant that controls the rate of convergence.

In some scenarios, the motorized system comprises an antenna system. The antenna system can comprise: a gimbal; a resolver coupled to the gimbal; first and second motors configured to cause movement of the gimbal in azimuth and elevation; first and second motor encoders respectively coupled to shafts of the first and second motors; a position reference generator configured to generate a position signal specifying a stable position of the gimbal; and a controller configured to use the stable position of the gimbal to control operations of the first and second motors. The resolver can include, but is not limited to, a gimbal resolver.

The position signal is generated by the position reference generator based on a first position signal generated by the resolver, a second position signal generated by the first motor encoder, and a third position signal generated by the second motor encoder. These signals are received by the position reference generator. The position reference generator then performs operations to: convert the second and third position signals into a velocity signal specifying a scaled velocity of the gimbal; convert the velocity signal into a fourth position signal specifying a position of the gimbal; and combine the first position signal and the fourth position signal to generate a fifth position signal representing a stable position of the gimbal.

In some scenarios, the motorized system comprises an antenna system with at least one motor and one at least one motor encoder. Accordingly, the antenna system comprises: a gimbal; a resolver coupled to the gimbal; at least one motor configured to cause movement of the gimbal in azimuth and elevation; at least one motor encoder coupled to a shaft of the at least one motor; a position reference generator; and a controller. The position reference generator is configured to: receive a first position signal generated by the resolver and a second position signal generated by the at least one encoder; convert the second signal into a velocity signal specifying a scaled velocity of the gimbal; convert the velocity signal into a third position signal specifying a position of the gimbal; combine the first position signal and the third position signal to generate a fourth position signal representing a stable position of the gimbal. The controller is configured to use the fourth position signal to control operations of the at least one motor.

The implementing system can comprise a circuit. The circuit can include a processor and a non-transitory computer-readable storage medium comprising programming instructions that are configured to cause the processor to implement a method for operating a motorized system and/or controlling motors of a motorized system. Alternatively or additionally, circuit includes logic circuits (e.g., subtractors, adders, multipliers, etc.), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Motorized pedestal antenna systems have an undesirable level of stiffness (e.g., low) for certain applications. Motor system stiffness has been conventionally addressed by reducing the dynamics of the system, incorporating feedback linearization within the system and/or using notch filters. Such conventional approaches are not suitable for applications in which certain specifications need to be met. Thus, an alternative approach for addressing motor system stiffness is presented herein.

The present solution generally uses two forms of feedback in combination. The two forms of feedback include (i) a dynamic response of a first feedback device that is coupled to a load and (ii) dynamic response(s) of stiffer second feedback device(s) that are coupled to the back of the motors. The first feedback device can include a gimbal resolver, while the second feedback device(s) can include motor encoder(s). The load can include a gimbal with an antenna reflector coupled thereto. Gimbal resolvers, motor encoders, gimbals and antenna reflectors are well known. In this case, the dynamic response of the gimbal resolver comprises a first reference gimbal axis position. The dynamic response of a motor encoder comprises a motor shaft position. The motor shaft position is converted into a motor shaft velocity, which is scaled and integrated to generate a second reference gimbal axis position. The first and second gimbal axis positions are then combined to generate a single position estimate. The second reference gimbal axis position may have an offset relative to the first reference gimbal axis position. This offset may be addressed prior to when the first and second reference gimbal axis positions are combined. The signal position estimate is then used by a controller to control the speed and/or position of the motors via a single control signal. This single-input-single-output (SISO) motor control technique allows higher dynamics without allowing the resonance associated with a spring constant to cause an issued in the motorized pedestal.

In some scenarios, two motors are being used as dual opposing motors on each axis (e.g., two motors in elevation and two motors in azimuth). A first motor can move the gimbal in the azimuth direction, while the second motor provides an opposing force to remove the slop in the gear train. The average velocity of the two motors is computed, filtered, scaled through a gear train, and/or integrated to generate a second position reference for use in controlling the axis.

Figure 1:
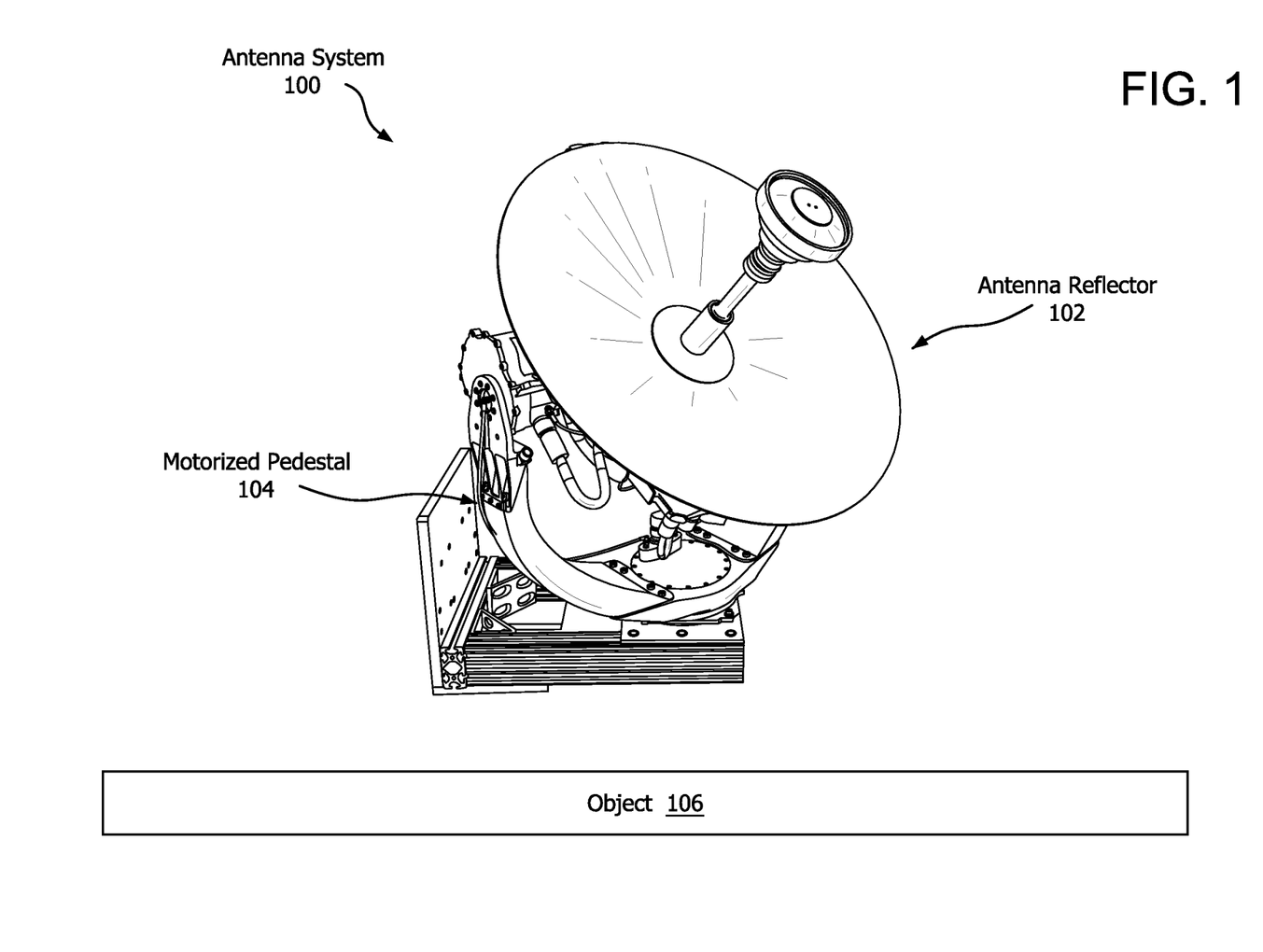
FIG. 1 is an illustration of an antenna system.

Referring now to FIG. 1, there is provided an illustration of a system 100 implementing the present solution. System 100 comprises an antenna system that is configured to send and receive Radio Frequency (RF) signals in accordance with known wireless signal communication techniques. The antenna system is mounted on an object 106. The object can include, but is not limited to, an aircraft, a mobile ground platform, a shipboard platform, a fixed platform (e.g., a ground station) or other object. The antenna system has a reflector 102 coupled to a motorized pedestal 104. The motorized pedestal 104 is generally configured to rotate and position the reflector 102 during use for various purposes such as direction finding for locating, identifying and tracking a moving emitter (e.g., an orbiting satellite). The rotation/positioning of the reflector 102 is achieved using motors and a motor control system as discussed below.

Figure 2:
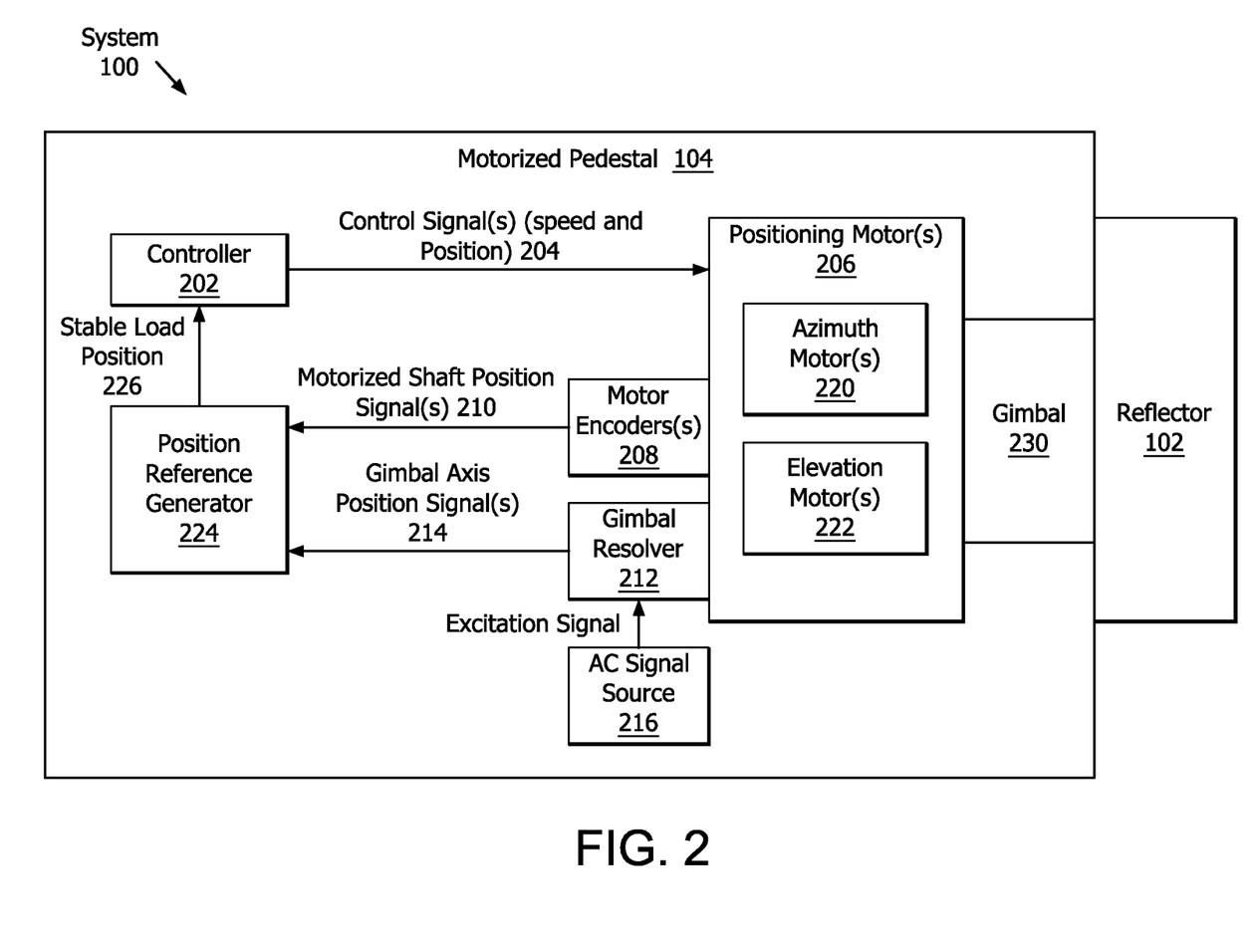
FIG. 2 is a block diagram of the antenna system shown in FIG. 1.

A block diagram of the system 100 is provided in FIG. 2. As shown in FIG. 2, the motorized pedestal 104 comprises a controller 202, positioning motor(s) 206, motor encoder(s) 208, a gimbal resolver 212, an AC signal source 216, a position reference generator 224, and a gimbal 230. Each of the listed components 202, 206, 208, 212, 216 is well known. The positioning motor(s) 206 can include azimuth motor(s) 220 and/or elevation motor(s) 222. The motor(s) 220, 222 can include, but are not limited to, servo motors. Servo motors are well known. A motor encoder 208 is disposed on a shaft of each motor 220, 222. The gimbal resolver 212 is coupled to the back gimbal 230 on which the reflector 102 is disposed.

The controller 202 is communicatively coupled to the motor(s) 220, 222, and provides the same with control signal(s) 204 for controllably changing a position and/or orientation of the antenna reflector 102. The control signal(s) 204 is(are) generated using a stable load position 226 estimated by the position reference generator 224. The stable load position 226 is generated in a manner that addresses motor stiffness of system 100. The term motor stiffness as used herein refers to the stiffness or spring constant between a motor output and a load.

The stable load position 226 is generated in a novel manner by combining (fusing) together signals 210, 214 output from the motor encoder(s) 208 and the gimbal resolver 212. The signal 210 output from each motor encoder 208 can comprise a pulsed signal indicating a motor shaft position (e.g., via a position count 1, 2, 3, etc.). The signal 214 output from the gimbal resolver 212 comprises a digital or analog signal indicating an axis position for the gimbal 230. The signals 210, 214 are fused together by position reference generator 224 in accordance with the present solution. Operations of position reference generator 224 will now be discussed in detail in relation to FIGS. 3-4.

Figure 3:
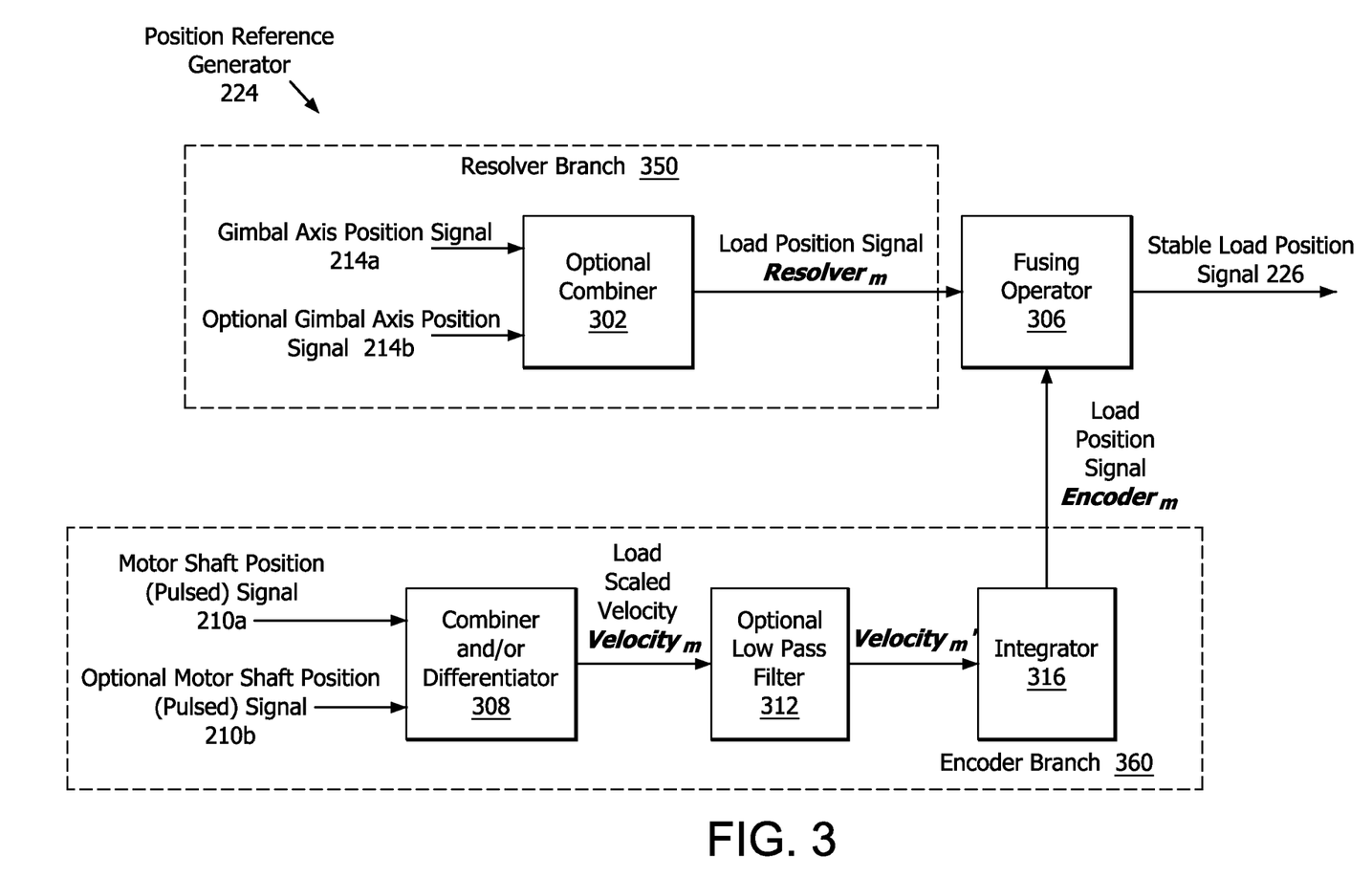
FIG. 3 is a block diagram of a position reference generator shown in FIG. 2.

As shown in FIG. 3, the position reference generator 224 comprises a resolver branch 350 and an encoder branch 360. One or more gimbal resolvers can be provided with system 100. In the case that a single gimbal resolver is provided with system 100, the gimbal axis position 214a output from the gimbal resolver is passed to a fusing operator 306.

Figure 5:
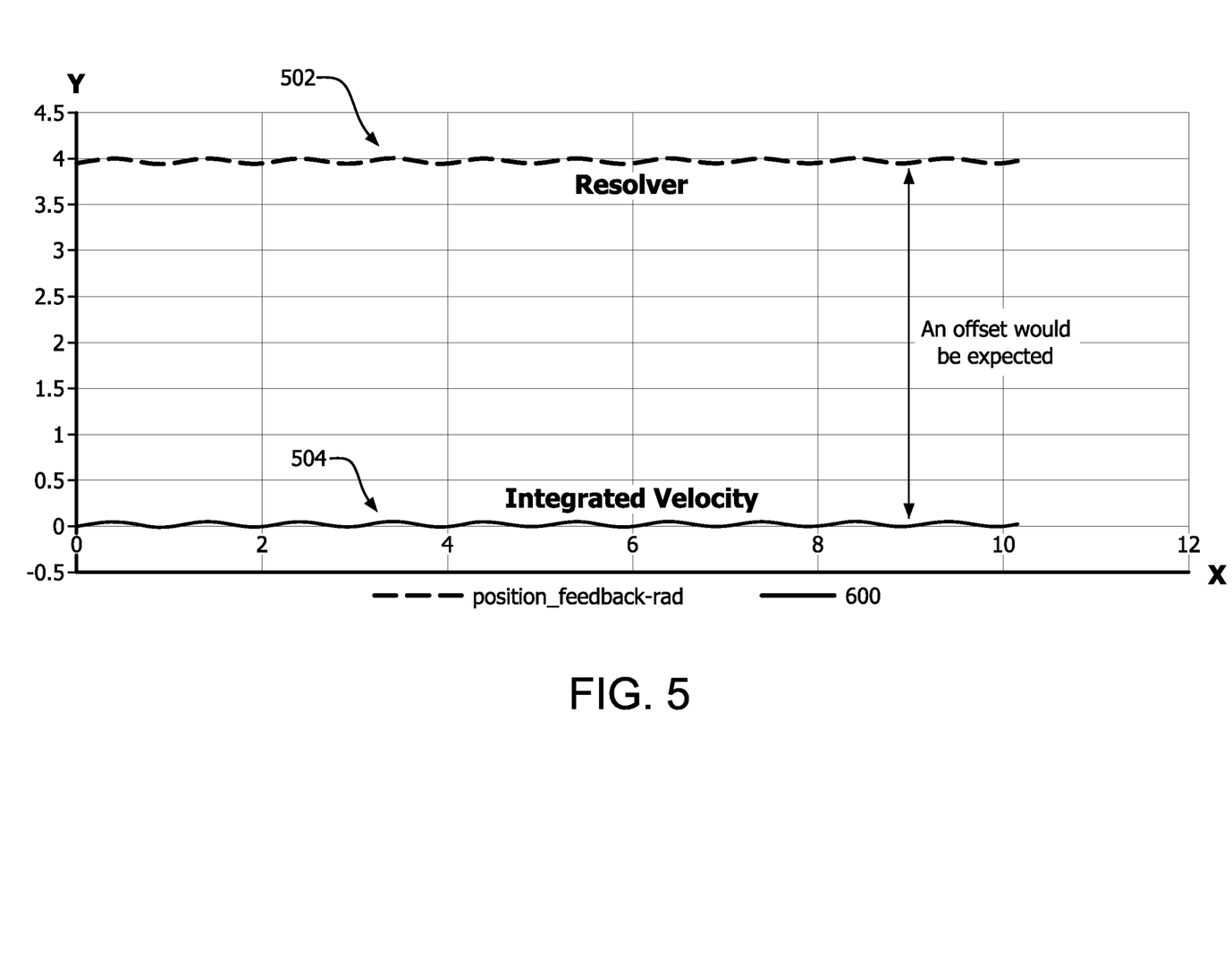
FIGS. 5-6 show graphs that are useful for understanding the present solution.

In contrast, when two or more gimbal resolvers are provided with system 100, the gimbal axis position signals 214a, 214b output from the resolvers are combined in block 302 to generate a load position signal $Resolver_m$. The manner in which the gimbal axis position signals 214a, 214b are combined can be the same as or similar to that described in U.S. Patent Publication No. 2009/0179635 to Cathy, which is incorporated herein by reference in its entirety. The load position signal $Resolver_m$ is passed to the fusing operator 306. A graph is provided in FIG. 5 which shows an illustrative resolver-based load position signal 502 that corresponds to the load position signal $Resolver_m$.

In the encoder branch 360, another load position signal $Encoder_m$ is generated from the motor shaft position signals 210a, 210b output from the motor encoders 208. The load position signal $Encoder_m$ is generated by: performing a combiner differential equation in block 308 using the motor shaft position signals 210a, 210b as inputs to convert the motor shaft positions to a scaled load velocity specified by signal $Velocity_m$; optionally performing low pass filter operations in block 312 to produce a filtered scaled load velocity signal $Velocity_m'$; and performing integrator operations in block 316 to convert the scaled load velocity signal $Velocity_m$ or $Velocity_m'$ to the load position signal $Encoder_m$. The load position signal $Encoder_m$ is provided as an input to the fusing operator 306. Combiner differential equations, low pass filter operations and integrator operations are well known.

In some scenarios, operations of the combiner differentiator 308 can be defined by the following mathematical equations (1).

$$Velocity_m = (\Delta s_{210a} + \Delta s_{210b})/(2\Delta t) \quad (1)$$

where $\Delta s_{210a}$ represents a change in motor shaft position derived from signal 210a, $\Delta s_{210b}$ represents a change in motor shaft position derived from signal 210b, and $\Delta t$ represents a change in time. The operations of integrator 316 can be defined by the following mathematic equation (2A) in a digital application and mathematical equation (2B) in an analog application.

$$X(t) = \int_0^T V \, dt \cong \sum_0^n v_i * \Delta t \quad (2A)$$

$$x(t) = \overset{t}{\underset{0}{S}} V \cdot d(t) \quad (2B)$$

where x(t) represents the distance the load traveled from time 0 to time t, V represents the scaled velocity of the load (i.e., $Velocity_m$ or $Velocity_m'$), and dt represents a change in time. The position of the load is then determined from a last known position and x(t). The present solution is not limited to the particulars of these scenarios. Other combiner differentiation and/or integration algorithms can be employed.

Figure 6:
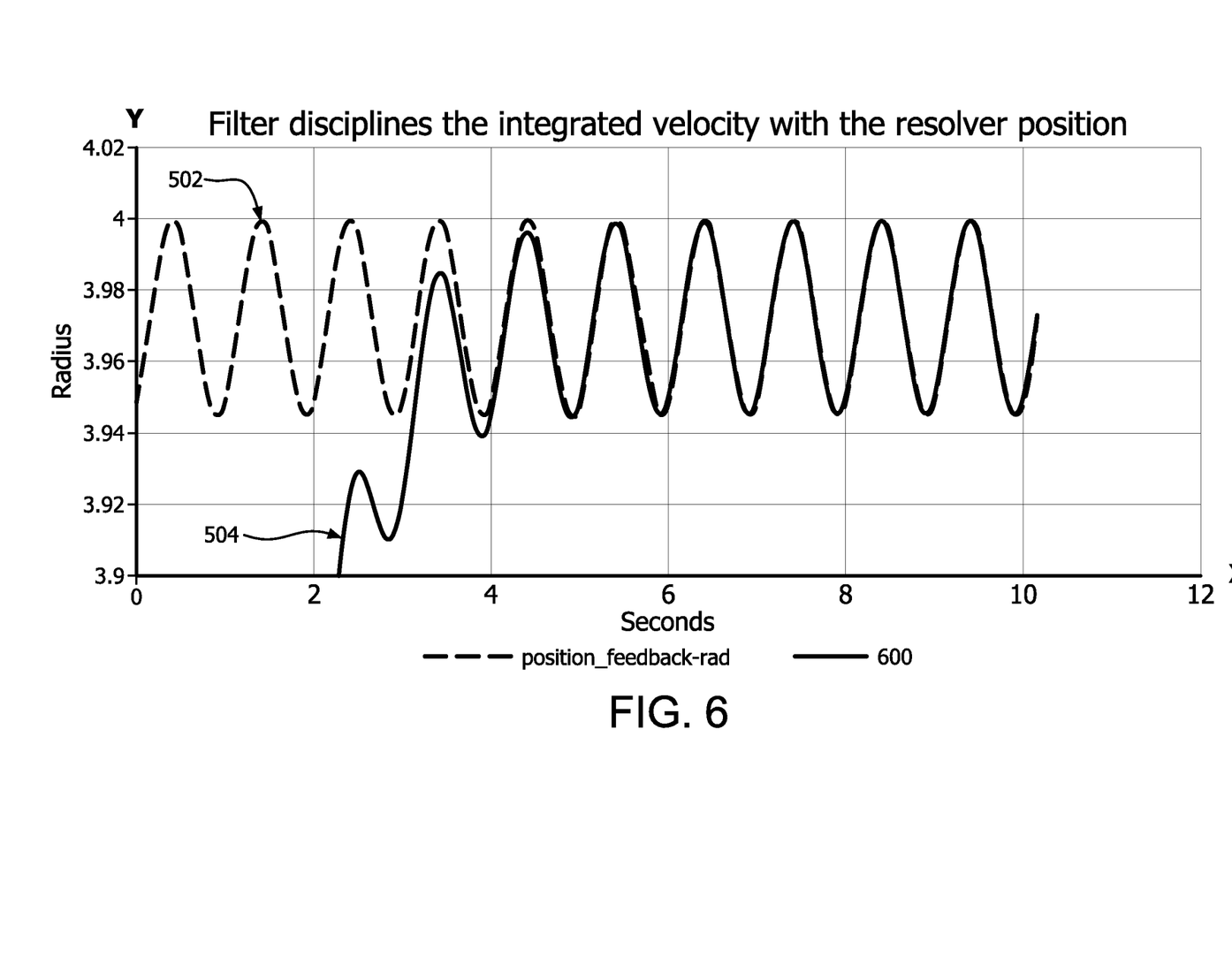

At the fusing operator 306, the load position signal $Resolver_m$ is fused or otherwise combined with the load position signal $Encoder_m$ to generate the stable load position 226. A graph is provided in FIG. 5 which shows an illustrative encoder-based load position signal 504 that corresponds to the load position signal $Encoder_m$. The pulses of the encoder-based load position signal 504 are offset from the corresponding pulses of the resolver-based load position signal 502. An FIR filter can be employed by the fusing operator 306 to remove this offset as shown in FIG. 6. FIR filters are well known.

Figure 4:
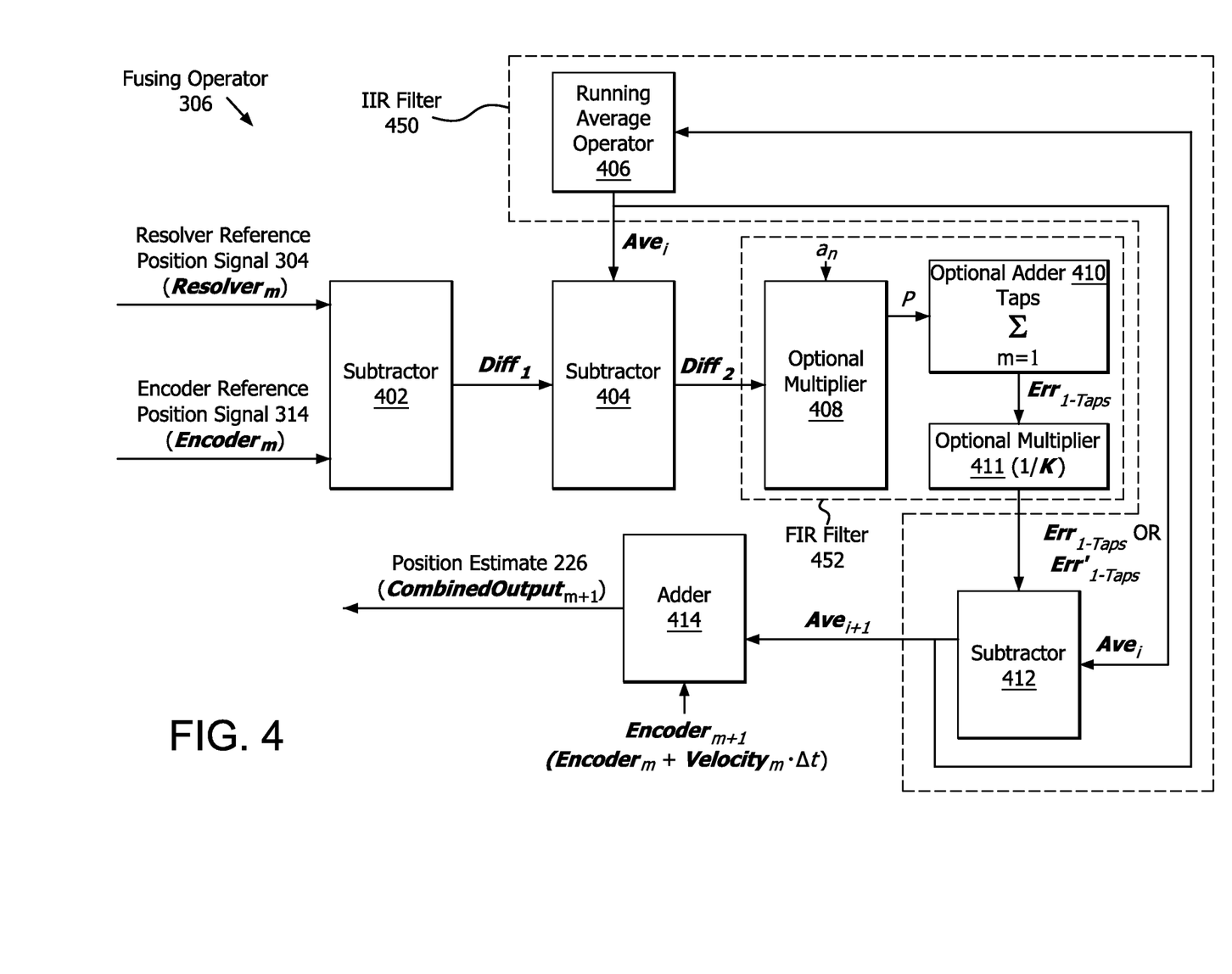
FIG. 4 is a block diagram of the fusing operator for fusing motor encoder and resolver feedback information.

In the case that an FIR filter is employed, the fusing operator 306 can implement the following mathematical equations (3)-(5).

$$Ave_{i+1} = Ave_i - \sum_{m=1}^{Taps} a_n(Ave_i - (Resolver_m - Encoder_m)), \text{ or} \quad (3)$$

$$Ave_{i+1} = Ave_i - \frac{1}{K}\sum_{m=1}^{Taps} a_m(Ave_i - (Resolver_m - Encoder_m)) $$

$$Encoder_{m+1} = Encoder_m + Velocity_m \cdot \Delta t \quad (4)$$

$$CombinedOutput_{m+1} = Ave_{i+1} + Encoder_{m+1} \quad (5)$$

where Taps represents the number of taps for the FIR filter, $a_n$ represents the FIR filter coefficients divided by the constant from the previous filter of K, $a_m$ represents the coefficients for the FIR filter, K is a constant that controls the rate of convergence, $Ave_i$ represents a running average of output from an Infinite Impulse Response (IIR) filter, and the $CombinedOutput_{m+1}$ represents the stable load position 226 which is input into controller 202. A detailed block diagram for an illustrative architecture implementing mathematical equations (3)-(5) is provided in FIG. 4.

In the case that a FIR filter is not employed, the fusing operator can implement the following mathematical equations (6)-(8).

$$Ave_{i+1} = Ave_i - (1/K)D \quad (6)$$

$$D = Ave_i - (Resolver_m - Encoder_m) \quad (7)$$

$$CombinedOutput_{m+1} = Ave_{i+1} + Encoder_{m+1} \quad (8)$$

It should be noted that additional operations can be performed to ensure that the difference between the load positions specified in signals $Resolver_m$ and $Encoder_m$ is correct. For example, let's assume that the load position of $Resolver_m$ is −179.2 (+/−180°) or 0.8 (360°), and the load position of $Encoder_m$ is 179.9 (+/−180°) or 359.9 (360°). In this case, the difference between the load positions of $Resolver_m$ and $Encoder_m$ should be 0.9. Operations are performed to ensure that the difference is 0.9 rather than −359.1. The present solution is not limited to the particulars of this example.

As shown in FIG. 4, the fusing operator 306 may comprise subtractors 402, 404, a multiplier 408, an IIR filter 450, an optional FIR filter 410, and an adder 414. The subtractor 402 is configured to subtract $Encoder_m$ from $Resolver_m$ to generate a first difference signal $Diff_1$. $Diff_1$ is defined by the following mathematical equation (9).

$$\text{Diff}_1 = \text{Resolver}_m - \text{Encoder}_m \quad (9)$$

Subtractor 404 is configured to subtract the difference signal $\text{Diff}_1$ from $\text{Ave}_i$ to produce a second difference signal $\text{Diff}_2$. $\text{Diff}_2$ is defined by the following mathematical equation (10).

$$\text{Diff}_2 = \text{Ave}_i - \text{Diff}_1 \quad (10)$$

The second difference signal $\text{Diff}_2$ is then multiplied by $a_n$ in block 408 to produce a signal P, which is defined by the following mathematical equation (11A) or (11B).

$$P = a_n \cdot \text{Diff}_2 \quad (11A)$$

$$P = a_m \cdot \text{Diff}_2 \quad (11B)$$

Signal P may then be passed to the FIR filter which is implemented by block(s) 410, 411. The output of block 410 is signal $\text{Err}_{1-Taps}$, and the output of block 411 is $\text{Err'}_{1-Taps}$.

Next in block 412, $\text{Err}_{1-Taps}$ or $\text{Err'}_{1-Taps}$ is subtracted from $\text{Ave}_i$ to produce signal $\text{Ave}_{i+1}$. Signal $\text{Ave}_{i+1}$ can be defined by the following mathematical equation (12).

$$\text{Ave}_{i+1} = \text{Ave}_i - \text{Err}_{1-Taps} \quad (12)$$

Signal $\text{Ave}_{i+1}$ is combined with a next encoder reference position signal $\text{Encoder}_{m+1}$ in block 414 to generate the stable load position 226. The stable load position 226 can be defined by the following mathematical equation (13).

$$\text{CombinedOutput}_{m+1} = \text{Ave}_{i+1} + \text{Encoder}_{m+1} \quad (13)$$

Blocks 402-414 can be implemented by a processor and a non-transitory computer-readable storage medium comprising programming instructions that are configured to cause the processor to implement the above-described subtraction, multiplication and addition operations. Alternatively or additionally, the implementing system may include logic circuits (e.g., subtractors, adders, multipliers, etc.), passive circuit components (e.g., resistors, capacitors, switches, delays, etc.) and/or other active circuit components (e.g., transistors, combiners, etc.).

Figure 7:
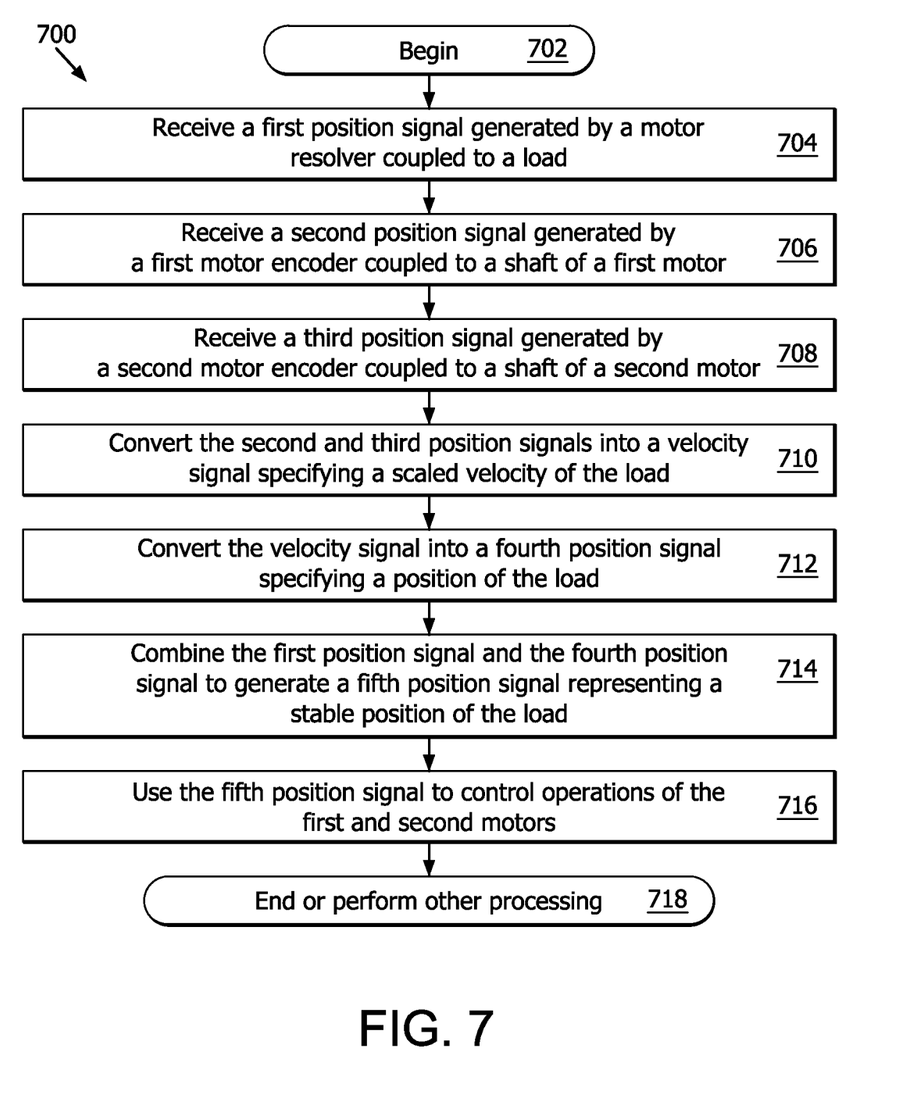
FIG. 7 provide flow diagrams of an illustrative method for operating a motorized system.

Referring now to FIG. 7, there is provided a method 1000 for operating a motorized system (e.g., system 100 of FIG. 1). Method 700 implements the process described above in relation to FIGS. 2-4. Method 700 begins with 702 and continues with 704 where a circuit (e.g., position reference generator 224 of FIGS. 2-4 and/or computing system 800 of FIG. 8) receives a first position signal (e.g., signal 214 of FIG. 2, 214a of FIG. 3 or Resolver$_m$ of FIG. 3) generated by a gimbal resolver (e.g., gimbal resolver 212 of FIG. 2) coupled to a load (e.g., gimbal 230 of FIG. 2). The circuit also receives a second position signal (e.g., signal 210a of FIG. 3) generated by a first motor encoder (e.g., motor encoder 208 of FIG. 2) coupled to a shaft of a first motor (e.g., azimuth motor 220), as shown by 706. It should be noted that the gimbal resolver and the motor encoders can run at the same or different rates. In the latter case, the integration happens at a relatively high speed and the equations happen every Nth (e.g., tenth) sample from the motor encoders. The circuit further receives a third position signal (e.g., signal 210b of FIG. 3) generated by a second motor encoder (e.g., motor encoder 208 of FIG. 2) coupled to a shaft of a second motor (e.g., elevation motor 222), as shown by 708. The first position signal may specify a gimbal axis position, the second position signal may specify a position for the shaft of the first motor, and the third position signal may specify a position for the shaft of the second motor.

In 710, the circuit performs operations to convert the second and third position signals (e.g., signals 210a and 210b of FIG. 3) into a velocity signal (e.g., signal Velocity$_m$) specifying a scaled velocity of the load. This conversion may be achieved using a combiner differentiation algorithm. The velocity signal is converted 712 into a fourth position signal (e.g., signal Encoder$_m$ of FIG. 3) specifying a position of the load.

The first position signal (e.g., signal 214 of FIG. 2, 214a of FIG. 3 or Resolver$_m$ of FIG. 3) and the fourth position signal (e.g., signal Encoder$_m$ of FIG. 3) are combined to generate a fifth position signal (e.g., signal 226 of FIGS. 2-3) representing a stable position of the load, as shown by 714. This combining may be achieved in accordance with mathematical equation (3)-(5) or (6)-(8) provided above. In 716, the fifth position signal is used to control operations of the first and second motors. Subsequently, 718 is performed where method 700 ends or other operations are performed.

Figure 8:
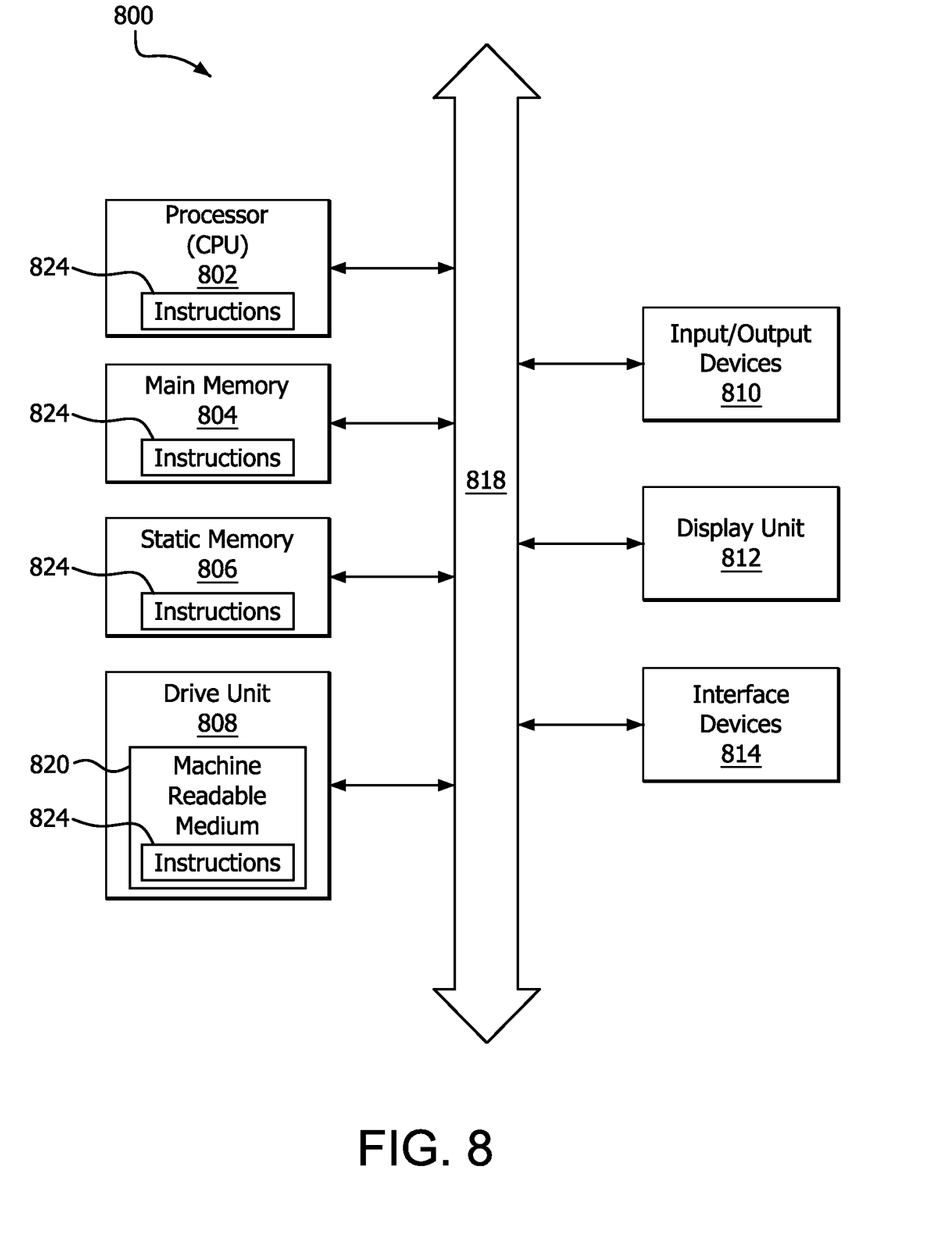
FIG. 8 provides an illustration of an architecture for a computing device.

Referring now to FIG. 8, there is shown a hardware block diagram comprising an example computer system 800 that can be used for implementing all or part of the motorized pedestal 104 of FIGS. 1-4. The machine can include a set of instructions which are used to cause the circuit/computer system to perform any one or more of the methodologies discussed herein. While only a single machine is illustrated in FIG. 8, it should be understood that in other scenarios the system can be taken to involve any collection of machines that individually or jointly execute one or more sets of instructions as described herein.

The computer system 800 is comprised of a processor 802 (e.g., a Central Processing Unit (CPU)), a main memory 804, a static memory 806, a drive unit 808 for mass data storage and comprised of machine readable media 820, input/output devices 810, an optional display unit 812 (e.g., a Liquid Crystal Display (LCD) or a solid state display, and one or more interface devices 814. Communications among these various components can be facilitated by means of a data bus 818. One or more sets of instructions 824 can be stored completely or partially in one or more of the main memory 804, static memory 806, and drive unit 808. The instructions can also reside within the processor 802 during execution thereof by the computer system. The input/output devices 810 can include a keyboard, a multi-touch surface (e.g. a touchscreen) and so on. The interface device(s) 814 can be comprised of hardware components and software or firmware to facilitate an interface to external circuitry. For example, in some scenarios, the interface devices 814 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 808 can comprise a machine readable medium 820 on which is stored one or more sets of instructions 824 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 800 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for operating a motorized system, comprising:
    receiving, by a circuit, a first position signal generated by a resolver coupled to a load, a second position signal generated by a first motor encoder coupled to a shaft of a first motor, and a third position signal generated by a second motor encoder coupled to a shaft of a second motor;
    converting, by the circuit, the second and third position signals into a velocity signal specifying a scaled velocity of the load;
    converting, by the circuit, the velocity signal into a fourth position signal specifying a position of the load;
    combining, by the circuit, the first position signal and the fourth position signal to generate a fifth position signal representing a stable position of the load; and
    using, by the circuit, the fifth position signal to control operations of the first and second motors.

2. The method according to claim 1, wherein the motorized system comprises a motorized pedestal antenna and the load comprises a gimbal to which an antenna reflector is connected.

3. The method according to claim 1, wherein the first position signal specifies a gimbal axis position, the second position signal specifies a position for the shaft of the first motor, and the third position signal specifies a position for the shaft of the second motor.

4. The method according to claim 1, wherein the second and third position signals are converted into the velocity signal using a combiner differentiation algorithm, and the velocity signal is converted into the fourth position signal using an integration algorithm.

5. The method according to claim 1, wherein the combining comprises operations implementing the following mathematical equations:

$$Ave_{i+1} = Ave_i - (1/K)D,$$

$$D = Ave_i - (Resolver_m - Encoder_m),$$

$$CombinedOutput_{m+1} = Ave_{i+1} + Encoder_{m+1}$$

wherein $Resolver_m$ represents the first position signal, $Encoder_m$ represents the fourth encoder signal, $Ave_i$ represents an average signal output from an infinite impulse response filter, $Encoder_{m+1}$ represents a sixth signal specifying a next position of the load, $CombinedOutput_{m+1}$ represents a signal specifying the stable position of the load, and K is a constant that controls how fast a filter converges.

6. The method according to claim 5, wherein D is combined with a finite impulse response filter prior to being subtracted from $Ave_i$.

7. A system, comprising:
    a processor;
    a non-transitory computer-readable storage medium comprising programming instructions that are configured to cause the processor to implement a method for operating a motorized system, wherein the programming instructions comprise instructions to:
        receive a first position signal generated by a resolver coupled to a load, a second position signal generated by a first motor encoder coupled to a shaft of a first motor, and a third position signal generated by a second motor encoder coupled to a shaft of a second motor;
        convert the second and third position signals into a velocity signal specifying a scaled velocity of the load;
        convert the velocity signal into a fourth position signal specifying a position of the load;
        combine the first position signal and the fourth position signal to generate a fifth position signal representing a stable position of the load; and
        use the fifth position signal to control operations of the first and second motors.

8. The system according to claim 7, wherein the motorized system comprises a motorized pedestal antenna and the load comprises a gimbal to which an antenna reflector is connected.

9. The system according to claim 7, wherein the first position signal specifies a gimbal axis position, the second position signal specifies a position for the shaft of the first motor, and the third position signal specifies a position for the shaft of the second motor.

10. The system according to claim 7, wherein the second and third position signals are converted into the velocity signal using a combiner differentiation algorithm, and the velocity signal is converted into the fourth position signal using an integration algorithm.

11. The system according to claim 7, wherein the first and fourth positions signals are combined in accordance with the following mathematical equations:

$$Ave_{i+1} = Ave_i - (1/K)D,$$

$$D = Ave_i - (Resolver_m - Encoder_m),$$

$$CombinedOutput_{m+1} = Ave_{i+1} + Encoder_{m+1}$$

wherein $Resolver_m$ represents the first position signal, $Encoder_m$ represents the fourth encoder signal, $Ave_i$ represents an average signal output from an infinite impulse response filter, $Encoder_{m+1}$ represents a sixth signal specifying a next position of the load, $CombinedOutput_{m+1}$ represents a signal specifying the stable position of the load, and K is a constant that controls how fast a filter converges.

12. The system according to claim 11, wherein D is combined with a finite impulse response filter prior to being subtracted from $Ave_i$.

13. An antenna system, comprising:
a gimbal;
a resolver coupled to the gimbal;
first and second motors configured to cause movement of the gimbal in azimuth and elevation;
first and second motor encoders respectively coupled to shafts of the first and second motors; and
a position reference generator configured to:
receive a first position signal generated by the resolver, a second position signal generated by the first motor encoder, and a third position signal generated by the second motor encoder;
convert the second and third position signals into a velocity signal specifying a scaled velocity of the gimbal;
convert the velocity signal into a fourth position signal specifying a position of the gimbal;
combine the first position signal and the fourth position signal to generate a fifth position signal representing a stable position of the gimbal; and
a controller configured to use the fifth position signal to control operations of the first and second motors.

14. The antenna system according to claim 13, further comprising an antenna reflector coupled to the gimbal.

15. The antenna system according to claim 13, wherein the first position signal specifies a gimbal axis position, the second position signal specifies a position for the shaft of the first motor, and the third position signal specifies a position for the shaft of the second motor.

16. The antenna system according to claim 13, wherein the second and third position signals are converted into the velocity signal using a combiner differentiation algorithm, and the velocity signal is converted into the fourth position signal using an integration algorithm.

17. The antenna system according to claim 13, wherein the first and fourth position signals are combined in accordance with the following mathematical equations:

$$Ave_{i+1} = Ave_i - (1/K)D,$$

$$D = Ave_i - (Resolver_m - Encoder_m),$$

$$CombinedOutput_{m+1} = Ave_{i+1} + Encoder_{m+1}$$

wherein $Resolver_m$ represents the first position signal, $Encoder_m$ represents the fourth encoder signal, $Ave_i$ represents an average signal output from an infinite impulse response filter, $Encoder_{m+1}$ represents a sixth signal specifying a next position of the load, $CombinedOutput_{m+1}$ represents a signal specifying the stable position of the load, and K is a constant that controls how fast a filter converges.

18. The antenna system according to claim 17, wherein D is combined with a finite impulse response filter prior to being subtracted from $Ave_i$.

19. An antenna system, comprising:
a gimbal;
a resolver coupled to the gimbal;
a motor configured to cause movement of the gimbal in one of an azimuth and an elevation;
at least one motor encoder coupled to a shaft of the motor; and
a position reference generator configured to:
receive a first position signal generated by the resolver and a second position signal generated by the at least one encoder;
convert the second signal into a velocity signal specifying a scaled velocity of the gimbal;
convert the velocity signal into a third position signal specifying a position of the gimbal;
combine the first position signal and the third position signal to generate a fourth position signal representing a stable position of the gimbal; and
a controller configured to use the fourth position signal to control operations of the motor.

* * * * *